April 7, 1970 C. JACKSON 3,505,132
METHOD OF ETCHING SEMICONDUCTIVE DEVICES HAVING LEAD-CONTAINING ELEMENTS
Filed Nov. 16, 1967
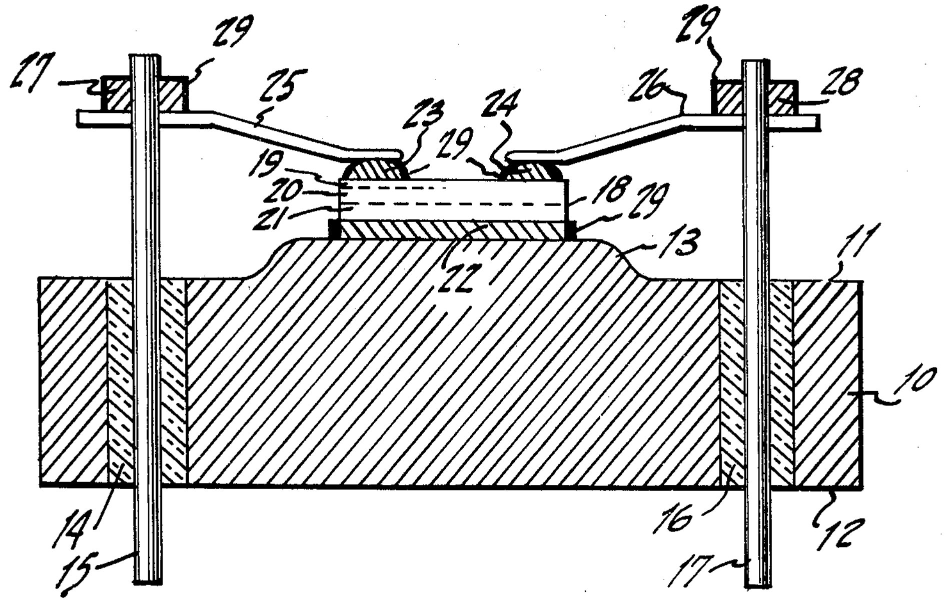
INVENTOR
Charles Jackson
By Abraham Sherman
Attorney United States Patent Office 3,505,132

Patented Apr. 7, 1970

3,505,132

METHOD OF ETCHING SEMICONDUCTIVE DEVICES HAVING LEAD-CONTAINING ELEMENTS

Charles Jackson, Elizabeth, N.J., assignor to RCA Corporation, a corporation of Delaware Filed Nov. 16, 1967, Ser. No. 683,568
Int. Cl. C23f *7/24*; H01l *7/50*
U.S. Cl. 148—6.24 6 Claims

ABSTRACT OF THE DISCLOSURE

In the fabrication of a semiconductive device, a crystalline semiconductive body such as silicon is etched in the presence of metallic lead by treating the body with an alkaline etchant such as sodium hydroxide solution which contains a water-soluble sulfide such as ammonium sulfide, an alkali metal sulfide, or the like. The sulfide forms an inert coating of lead sulfide on the metallic lead present, and thus reduces the amount of lead which is attacked and dissolved by the etchant. The inert coating may be left in situ in the completed device.

BACKGROUND OF THE INVENTION

Field of the invention

This invention relates to improved semiconductive devices which include lead-containing elements, and to improved methods of fabricating them by etching crystalline semiconductive bodies in the presence of metallic lead.

Description of the prior art

In the fabrication of semiconductive devices, it is frequently necessary to etch a crystalline semiconductive body in the presence of metallic lead. The term "lead" is used hereinafter in a generic sense as including alloys such as solder which have lead as their principal constituent. The metallic lead may be present on portions of the surface of the semiconductive body as a metallic contact. See for example U.S. Patent 3,046,176 issued July 24, 1962, to W. A. Bosenberg. Metallic lead may also be present in the form of lead or solder preforms when the semiconductive body has been mounted on a header. It is desirable to clean the surface of the semiconductive body with a suitable etchant after the body has been bonded to a header, and before electrical lead wires are attached to electrodes on the body. This step of providing a cleanup etch for the semiconductive body after it has been mounted on a header is known in the art as postmount etching.

Since an acid etchant capable of etching the semiconductive body would attack metallic lead more rapidly than an alkaline etchant, the solution utilized for such post-mount etching is generally alkaline, and may for example comprise an aqueous solution of sodium hydroxide or potassium hydroxide, or the like. However, even such alkaline etchants dissolve more of the metallic lead present than is desirable. The lead which is dissolved by the etchant may later be redeposited on undesired portions of the semiconductive body. Moreover, when semiconductor devices thus fabricated are tested by plotting the I–V curves across their junctions, it is found that the knees of the courves are not as sharp as is desirable. This may be due to surface contamination of the semiconductive body by the etchant.

SUMMARY OF THE INVENTION

A semiconductor device includes a lead-containing element and a coating of lead sulfide thereon. The coating may be provided by the method wherein a semiconductive body is etched in the presence of metallic lead by treating the body with an alkaline etchant which contains a water-soluble sulfide.

THE DRAWING

The single figure of the drawing is a cross-sectional view of a step in the fabrication of a semiconductive device according to one embodiment of the invention.

DESCRIPTION OF THE PREFERRED EMBODIMENTS

Example I

Referring to the drawing, a metallic header 10 utilized to mount the device in this example has two opposing surfaces 11 and 12, a pedestal 13 on the surface 11, two spaced insulating glass eyelets 14 and 16 normal to the surfaces 11 and 12, and two metallic pins 15 and 17 set in the eyelets 14 and 16 respectively.

A crystalline semiconductive body 18 is prepared by any convenient method with a coating of lead on at least a portion of the body surface. The lead coating may be deposited as described in the aforesaid U.S. Patent 3,046,176. The precise size, shape and composition of semiconductive body 18 is not critical. The semiconductive body 18 may for example consist of silicon, germanium, silicon-germanium alloys, semiconductive compounds such as gallium arsenide, or the like. In this example, the semiconductive body 18 consists of silicon. The semiconductive body 18 may include electronically active regions such as P type and N type regions on opposite sides of PN junctions. In this example, the semiconductive body 18 has been formed into a transistor, and includes as its active regions emitter and base and collector regions 19, 20 and 21 respectively, which are separated by two PN junctions shown as dotted lines in the drawing. The semiconductive body 18 has been provided with a lead coating 22 on one surface of body 18 adjacent the collector region 21. On an opposite surface of body 18 two spaced lead coatings 23 and 24 have been provided as contacts for emitter region 19 and base region 20 respectively.

The semiconductive body 18 is positioned on the header 10 so that the lead coating 22 rests on the pedestal 13. An emitter connector 25 is positioned with one end resting on the emitter contact 23, and the other end around the pin 15. Similarly, a base connector 26 is positioned with one end resting on the base contact 24 and the other end around the pin 17. Lead preforms 27 and 28 are positioned on pins 15 and 17 respectively in contact with the connectors 25 and 26 respectively. The assemblage is then heated in a non-oxidizing ambient to a temperature above the melting point of lead but below the melting point of the semiconductive body 18. The semiconductive body 18 is thus bonded to the pedestal 13 by the lead layer 22. At the same time, the emitter and base connectors 25 and 26 are bonded between their respective pins 15 and 17 and their respective electrodes 23 and 24.

After this mounting step, the surface of the semiconductive body 18 is cleaned with an etchant. In this example, the etchant consists of 300 grams of potassium hydroxide and 50 grams of potassium ferrocyanide dissolved in a liter of deionized water. The solution also contains a water-soluble sulfide such as ammonium sulfide or one of the alkali metal sulfides such as lithium sulfide, sodium sulfide, potassium sulfide, rubidium sulfide and cesium sulfide. The precise amount of the water-soluble sulfide is not critical, and is preferably about 2 to 20 grams per liter. In this example, each liter of the etchant contains 10 grams of sodium sulfide.

The assemblage is treated in the above etchant at a temperature of about 100° C. for about 2 to 5 minutes. The surface of the semiconductive body 18 is thereby cleaned. At the same time, an inert protective coating 29 consisting of lead sulfide is formed on the surface of all the masses of lead present. The coating 29 may be described as a genetic coating, since it is derived or formed from the underlying masses of lead. The lead sulfide coating 29 may be left in situ in the completed device, or may be removed if desired by treatment with dilute hydrochloric acid. The subsequent steps of encapsulating and casing the device are accomplished by standard methods of the art.

One advantage of the method is that the amount of the lead present which is dissolved by the etchant is minimized, because the water-soluble sulfide present in the etchant forms a protective coating of insoluble lead sulfide over all the lead present. Since the lead layer 22 is acting as the bonding agent between the header 10 and the semiconductive body 18, the removal of an excess amount of lead by the etchant would weaken the adhesion between the semiconductive body 18 and the header 10.

Another advantage of the method is that the precipitation of lead from the etchant on undesired portions of the semiconductive body 18 is minimized because the amount of lead dissolved by the etchant is minimized. Such deposition of lead on the semiconductive body 18 is undesirable because it tends to degrade the electrical characteristics of the completed device.

An unexpected advantage of the method is that when the junction devices such as transistors are thus etched after mounting, the characteristic current-voltage curves for the reverse biased collector-base junction exhibited sharper "knees" than the curves for comparable devices etched according to the prior art after mounting. Improving the sharpness of the knees of these curves improves the electrical operating characteristics and stability of the completed devices.

Example II

In this example, the same metallic header 10 is utilized, but the crystalline semiconductive body 18 consists of a monocrystalline silicon-germanium alloy such as described by B. Selikson in U.S. Patent 2,997,410, issued on Aug. 22, 1961. Portions of the surface of semiconductive body 18 are covered with a coating consisting of a lead alloy. In this embodiment, the layer 22 adjacent the collector region 21, the emitter electrode 23, the base electrode 24, as well as the preforms 27 and 28, all consist of an alloy of 90% lead and 10% tin by weight. The assemblage of metallic header 10 and semiconductive body 18 is heated in a non-oxidizing ambient to a temperature above the melting point of the lead alloy utilized but below the melting point of the semiconductive body 18 so as to bond the semiconductive body 18 to the pedestal 13.

The assemblage is now treated for about 2 to 5 minutes at a temperature of about 100° C. in an alkaline etchant including a water-soluble sulfide. In this example, the etchant consists of 200 grams sodium hydroxide, 30 grams sodium ferrocyanide, and 15 grams of potassium sulfide, all dissolved in a liter of deionized water. A protective coating 29 of lead sulfide is formed on the surface of all the lead alloy masses present. The subsequent steps of encapsulating and casing the device are accomplished by standard methods of the art.

The above examples are by way of illustration only, and not by way of limitation. Other semiconductive bodies and other lead alloys may be utilized.

I claim:

1. The method of etching a crystalline semiconductive body in the presence of metallic lead comprising treating said body with an alkaline etchant which contains a water-soluble sulfide so as to form a protective coating of lead sulfide on the metallic lead which is resistant to the etchant.

2. The method as in claim 1, wherein said soluble sulfide is selected from the group consisting of the alkali metal sulfides and ammonium sulfide.

3. The method as in claim 1, wherein said semiconductive body consists of silicon.

4. The method of etching a crystalline semiconductive body in the presence of metallic lead comprising treating said body with an etchant comprising an aqueous solution of an alkali metal hydroxide, an alkali metal ferrocyanide, and a water-soluble sulfide so as to form a protective coating of lead sulfide on the metallic lead which is resistant to the etchant.

5. The method as in claim 4, wherein said etchant contains about 2 to 20 grams of said water-soluble sulfide per liter.

6. The method as in claim 4, wherein said water-soluble sulfide is selected from the group consisting of lithium sulfide, sodium sulfide, potassium sulfide, rubidium sulfide, cesium sulfide, and ammonium sulfide.

References Cited

UNITED STATES PATENTS

| | | | |
|---|---|---|---|
| 1,944,778 | 1/1934 | Benit | 148—6.24 |
| 2,263,905 | 11/1941 | Snow | 148—6.24 |
| 2,266,378 | 12/1941 | Farrington et al. | 148—6.24 |
| 2,410,268 | 10/1946 | Carlson | 156—17 X |
| 2,890,159 | 6/1959 | Amaya | 156—17 X |
| 3,081,211 | 3/1963 | Rickel | 156—9 |
| 3,154,450 | 10/1964 | Hoeckelman et al. | 156—17 |
| 3,447,984 | 6/1969 | Castrucci et al. | 156—17 X |

ALFRED L. LEAVITT, Primary Examiner

J. R. BATTEN, Jr., Assistant Examiner

U.S. Cl. X.R.

156—17; 252—79.5; 317—235